(No Model.)
W. C. HOWELLS.
FRUIT GATHERER.
No. 278,017. Patented May 22, 1883.
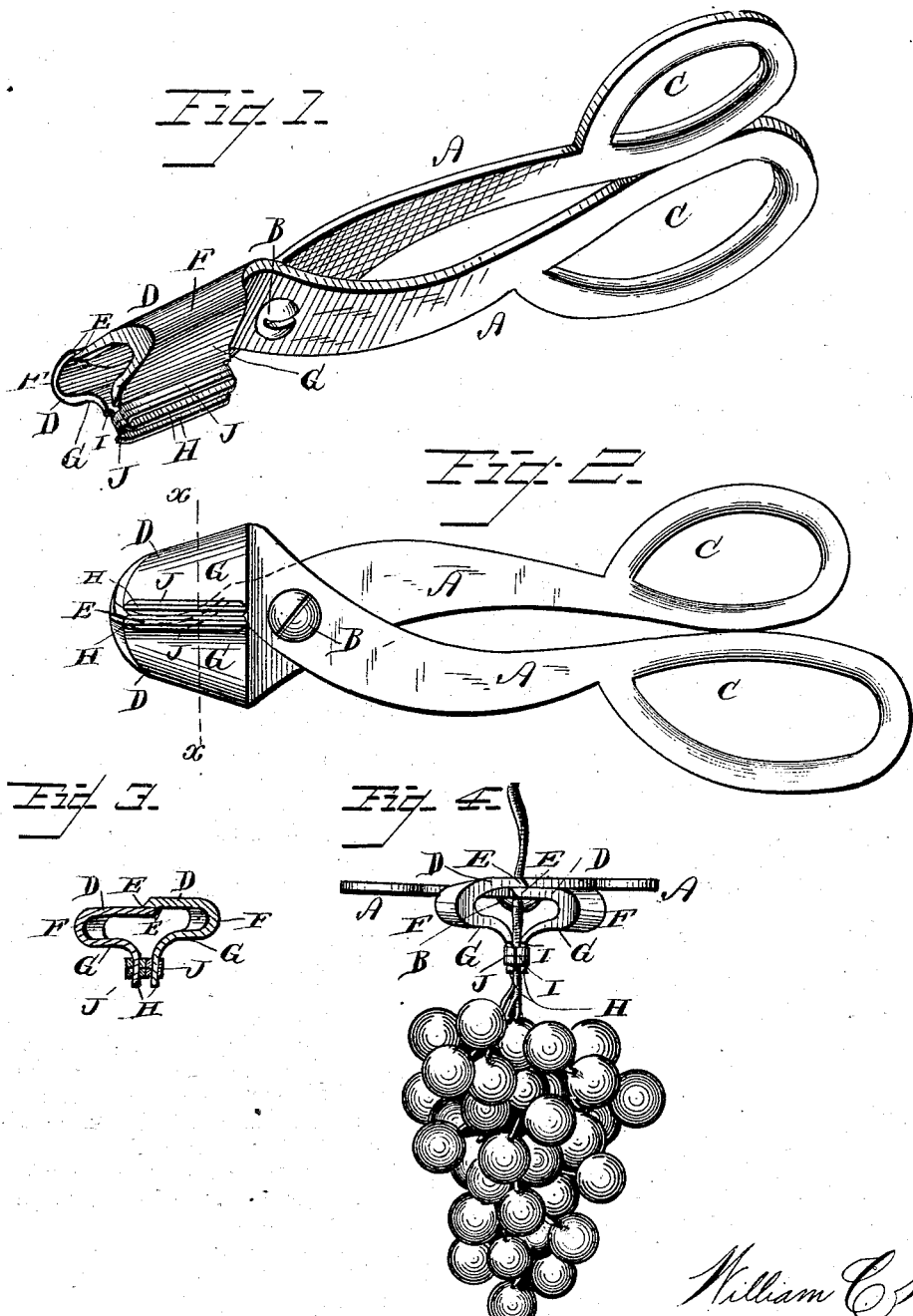

UNITED STATES PATENT OFFICE.

WILLIAM C. HOWELLS, OF JEFFERSON, OHIO.

FRUIT-GATHERER.

SPECIFICATION forming part of Letters Patent No. 278,017, dated May 22, 1883.

Application filed February 6, 1883. (No model.)

*To all whom it may concern:*

Be it known that I, WILLIAM C. HOWELLS, a citizen of the United States, residing at Jefferson, in the county of Ashtabula and State of Ohio, have invented a new and useful Fruit-Gatherer, of which the following is a specification, reference being had to the accompanying drawings.

This invention relates to shears or devices for gathering grapes and other fruits, flowers, and the like; and it consists in certain improvements in the construction of the same, which will be hereinafter fully described, and particularly pointed out in the claims.

In the drawings hereto annexed, Figure 1 is a perspective view of my improved fruit-gathering device. Fig. 2 is a bottom view of the same. Fig. 3 is a transverse sectional view on the line $x\ x$ in Fig. 2; and Fig. 4 is a front view, illustrating the operation of the device.

The same letters refer to the same parts in all the figures.

In the drawings hereto annexed, A A represent the handles of the device, which are connected pivotally by means of a screw or rivet, B, in the same manner as an ordinary pair of shears. The lower or rear ends of the handles A have loops or eyes C to receive the thumb and fingers of the operator. The front ends of the handles form jaws D D, having suitable cutting-edges, E E, engaging each other, scissors-like, for the purpose of severing the stems of the fruits or flowers to be gathered. I prefer to make the cutting-edges E E respectively concave and convex, in order to prevent the stem to be severed from slipping while in the act of being cut. The outer edges of the jaws D D have downturned flanges F F, the lower edges of which have inwardly-extending brackets G G, the inner edges of which are also turned downwardly, so as to form flanges H H, which are on a line with the cutting-edges of the jaws. The ends of flanges H H are provided with notches I I, serving to hold in place rubber straps J, or other suitable winding or packing of rubber, twine, or any other material which will serve to grasp and hold the stem to be severed tightly, and without danger of either crushing it or letting it slip and drop.

The operation of my invention will be readily understood from the foregoing description, taken in connection with the drawings hereto annexed. The device is to be held or grasped in the same manner as an ordinary pair of shears, with the flanges H turned downward, as shown clearly in Fig. 4 of the drawings. When a fruit or flower-stem is severed by the cutting-edges its upper end will be grasped and held by the flanges H, thus preventing the fruit or flower from dropping to the ground, but holding it while it is being lifted to a suitable basket or other receptacle, into which it may be dropped by simply releasing the pressure upon the handles of the device.

I claim as my invention and desire to secure by Letters Patent of the United States—

1. In a fruit-gathering device, the combination of a pair of handles, pivoted together, as shown, and provided with jaws having cutting-edges at their inner sides, and provided at their outer edges with downturned flanges having inwardly-extending brackets, the inner edges of which are provided with downturned holding-flanges in a line with the cutting-edges of the jaws, as set forth.

2. In a fruit-gathering device of the class described, the herein-described holding-flanges, having notched ends, in combination with rubber bands secured upon the said flanges, as and for the purpose set forth.

In testimony that I claim the foregoing as my own I have hereto affixed my signature in presence of two witnesses.

WILLIAM C. HOWELLS.

Witnesses:
WM. BAGGER,
WM. J. LITTELL.